(12) United States Patent
Park

(10) Patent No.: US 12,157,434 B2
(45) Date of Patent: Dec. 3, 2024

(54) SMART KEY SYSTEM CAPABLE OF OPERATING EVEN WHEN UWB COMMUNICATION IS IMPOSSIBLE DUE TO BATTERY VOLTAGE DROP OF FOB AND OPERATION METHOD THEREOF

(71) Applicant: HYUNDAI MOBIS CO., LTD., Seoul (KR)

(72) Inventor: Yong Hee Park, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 322 days.

(21) Appl. No.: 17/660,021

(22) Filed: Apr. 20, 2022

(65) Prior Publication Data

US 2022/0371549 A1 Nov. 24, 2022

(30) Foreign Application Priority Data

May 20, 2021 (KR) .................. 10-2021-0065108
May 20, 2021 (KR) .................. 10-2021-0065109
May 20, 2021 (KR) .................. 10-2021-0065110

(51) Int. Cl.
  *B60R 25/24* (2013.01)
  *B60R 25/01* (2013.01)
  (Continued)

(52) U.S. Cl.
  CPC ............ *B60R 25/245* (2013.01); *B60R 25/01* (2013.01); *B60R 25/209* (2013.01);
  (Continued)

(58) Field of Classification Search
  None
  See application file for complete search history.

(56) References Cited

U.S. PATENT DOCUMENTS 10,358,114 B2 * 7/2019 Szczepaniak ........... H04L 9/088
2014/0320262 A1 * 10/2014 Park ................... G07C 9/00309
                                                        340/5.61
(Continued)

FOREIGN PATENT DOCUMENTS

CN     107792007 A  *  3/2018  .......... B60R 25/245
JP     2014156750 A  *  8/2014

*Primary Examiner* — Aniss Chad
*Assistant Examiner* — Madison R. Inserra
(74) *Attorney, Agent, or Firm* — DLA Piper LLP US

(57) ABSTRACT

A smart key system of a vehicle that notifies a user that a fob battery needs to be replaced, including a fob configured to transmit information that the battery needs to be replaced to an in-vehicle communication module configured to transmit the information to an identification authentication unit (IAU); and the IAU configured to transmit the information to an integrated body unit (IBU) configured to notify a user of the information. A smart key system includes: a fob configured to transmit failure information to a BLE module when UWB communication fails due to battery voltage drop; the BLE module configured to receive the failure information, and measure a distance for positioning the fob using a BLE signal; and an IBU configured to transmit an operation signal to a controller configured to control at least one function among vehicle door opening and closing, vehicle start, remote parking, and vehicle door locking.

18 Claims, 12 Drawing Sheets

(51) Int. Cl.
  _B60R 25/20_ (2013.01)
  _B60W 30/06_ (2006.01)
  _H04W 4/80_ (2018.01)
  _H04W 4/02_ (2018.01)
  _H04W 4/029_ (2018.01)
  _H04W 4/40_ (2018.01)

(52) U.S. Cl.
  CPC ........ _B60R 2325/101_ (2013.01); _B60W 30/06_ (2013.01); _B60W 2556/45_ (2020.02); _H04W 4/80_ (2018.02)

(56) References Cited

U.S. PATENT DOCUMENTS

| 2016/0318475 | A1 | 11/2016 | Honkanen | |
|---|---|---|---|---|
| 2020/0247363 | A1 | 8/2020 | Golsch | |
| 2020/0310406 | A1* | 10/2020 | Lavoie | ................ G05D 1/0016 |
| 2021/0306033 | A1* | 9/2021 | Eber | ....................... H04W 4/80 |

* cited by examiner

SMART KEY SYSTEM CAPABLE OF OPERATING EVEN WHEN UWB COMMUNICATION IS IMPOSSIBLE DUE TO BATTERY VOLTAGE DROP OF FOB AND OPERATION METHOD THEREOF

CROSS-REFERENCE TO RELATED APPLICATION

This application claims priority to and the benefit of Korean Patent Application Nos. 10-2021-0065108, 10-2021-0065109, and 10-2021-0065110 filed on May 20, 2021, the disclosure of which is incorporated herein by reference in their entireties.

BACKGROUND

Field of the Invention

The present invention relates to a smart key system and an operation method thereof, and more specifically, to a smart key system capable of performing a vehicle door opening and closing function, a vehicle start function, a remote parking assist function, and an automatic vehicle locking function under a condition of a battery voltage drop of a fob and an operation method thereof.

Discussion of Related Art

Fobs which perform wireless communication with LF signals and RF (UHF band) signals are currently being mass-produced, and fobs which perform wireless communication with near field communication (NFC) signals, BLUETOOTH® low energy (BLE) signals, and ultra-wideband (UWB) signals are under development. The fob and an NFC module, a BLE module, and a UWB module in a vehicle communicate with each other to perform an opening and closing function of a vehicle door, a vehicle start function, a remote parking assist function, and an automatic locking function.

When a user with the fob approaches within a few tens of meters of the vehicle, the fob and the BLE module in the vehicle are connected, and in this case, a UWB IC of the fob periodically transmits data so that the vehicle can check a position of the fob. It is possible to open and close the vehicle door or start the vehicle by checking whether the user with the fob is near or in the vehicle through UWB communication between the UWB IC in the fob and the UWB module in the vehicle. Further, through UWB communication, when it is determined that the user with the fob is present in an area a few meters or tens of meters away from the vehicle, the vehicle can be parked while pressing a button of the fob, and when the user with the fob turns off the vehicle, gets out of the vehicle, closes the door, and moves away from the vehicle, automatic vehicle door locking is performed.

However, when a battery of the fob has been used for more than several months and thus capacity deteriorates and the battery voltage falls below a certain voltage during UWB communication, the fob cannot perform a UWB communication function. According to the related art, when the UWB IC of the fob fails to transmit data to the vehicle, since the vehicle cannot determine the position of the fob, there is a problem in that opening and closing a vehicle door, the vehicle start, the remote parking assist, and the automatic vehicle door locking cannot be performed.

SUMMARY OF THE INVENTION

The present invention is directed to providing a smart key system capable of performing an opening and closing function of a vehicle door, a vehicle start function, a remote parking assist function, and an automatic locking function even when a battery of a fob is used for several months and thus capacity deteriorates, and an operation method thereof.

The objects to be solved by the present invention is not limited to the above-mentioned object, and other objects not mentioned herein will be clearly understood by those skilled in the art from the following disclosure.

According to an aspect of the present invention, there is provided a smart key system of a vehicle that notifies a user to recognize that a fob battery needs to be replaced, the smart key system including: a fob configured to transmit information that a built-in battery needs to be replaced to a communication module to be described below; an in-vehicle communication module configured to transmit the information to an identification authentication unit (IAU) to be described below; the IAU configured to transmit the information to an integrated body unit (IBU) to be described below; and the IBU configured to notify the user of the information through a predetermined method.

Further, the in-vehicle communication module may be a BLUETOOTH® low energy (BLE) module.

In addition, the predetermined method may include any one of display of a dashboard of the vehicle, display of a mobile phone connected to the vehicle, and a warning sound.

In addition, according to another aspect of the present invention, there is provided a smart key system of a vehicle that notifies a user to recognize that a fob battery needs to be replaced, the smart key system including: a fob configured to transmit a value of a voltage of a battery to a communication module to be described below when the voltage of the built-in battery is smaller than or equal to a specific voltage; an in-vehicle communication module configured to transmit the value of the battery voltage to an IAU to be described below; the IAU configured to transmit the value of the battery voltage to an IBU to be described below; and the IBU configured to gradually increase a level of notification that the battery needs to be replaced to a user when the value of the battery voltage smaller than or equal to the specific voltage is repeatedly transmitted at an interval of a predetermined period.

In addition, the specific voltage may be a voltage greater than or equal to a minimum voltage at which the fob communicates with an ultra-wideband (UWB) module of the vehicle.

In addition, according to still another aspect of the present invention, there is provided a fob of a vehicle including: a main control unit (MCU) configured to check a voltage of a battery in the fob, and configured to transmit information that the battery in the fob needs to be replaced when a case in which the voltage is smaller than or equal to a specific voltage is detected several times to a communication unit to be described below in the fob; and the communication unit configured to transmit the information that the battery needs to be replaced to an in-vehicle communication module, wherein the specific voltage is a voltage greater than or equal to a minimum voltage at which the fob communicates with an ultra-wideband (UWB) module of the vehicle.

In addition, the communication unit may be a BLE communication unit.

In addition, according to yet another aspect of the present invention, there is provided a fob of a vehicle including: an MCU configured to check a voltage of a battery in the fob, and configured to transmit a value of the voltage when a case in which the voltage is smaller than or equal to a specific voltage is detected several times to a communication unit to be described below; and the communication unit configured to transmit the value of the voltage to an in-vehicle communication module, wherein the specific voltage is a voltage greater than or equal to a minimum voltage at which the fob communicates with a UWB module of the vehicle.

In addition, according to yet another aspect of the present invention, there is provided a method of operating a smart key system of a vehicle that notifies a user to recognize that a battery of a fob needs to be replaced, the method including: transmitting, by a fob, information that the battery of the fob needs to be replaced to an in-vehicle communication module; transmitting, by the communication module, the information that the battery needs to be replaced to an in-vehicle IAU; transmitting, by the IAU, the information that the battery needs to be replaced to an in-vehicle IBU; and notifying, by the IBU, a content that the battery of the fob needs to be replaced to the user.

In addition, the in-vehicle communication module may be a BLE module.

In addition, according to yet another aspect of the present invention, there is provided a method of operating a fob of a vehicle including: checking, by an MCU in the fob, a battery voltage of the fob during communication with an in-vehicle communication module; and transmitting information that a battery of the fob needs to be replaced to the in-vehicle communication module when the battery voltage is detected several times below a specific voltage as the checked result.

In addition, the specific voltage may be a voltage greater than or equal to a minimum voltage at which the fob communicates with a UWB module of the vehicle.

In addition, according to yet another aspect of the present invention, there is provided a smart key system configured to perform a vehicle door opening and closing function and a vehicle start function in response to a battery voltage drop, the smart key system including: a fob configured to transmit failure information to a BLE module to be described below when UWB communication fails; the in-vehicle BLE module configured to receive the failure information, and measure a distance for positioning of the fob using a BLE signal; and an IBU configured to transmit an operation signal to a controller configured to control the vehicle door opening and closing function and the vehicle start function based on positioning information of the fob which is checked based on the BLE signal.

In addition, the present invention may further include an IAU configured to request the positioning of the fob to the BLE module when the UWB communication fails, and check a position of the fob using a distance measurement result value received from the BLE module.

In addition, the IBU may receive the checked fob position from the IAU to determine whether to open or close a door of a vehicle and whether to start the vehicle.

In addition, the distance measurement using the BLE signal may be distance measurement using a received signal strength indicator (RSSI) value of the BLE signal.

In addition, according to yet another aspect of the present invention, there is provided a method of operating a smart key system that performs a vehicle door opening and closing function and a vehicle start function in response to a battery voltage drop, the method including: forming a BLE connection between a fob and an in-vehicle BLE module; transmitting, by the fob, a communication failure content to the BLE module when UWB communication is impossible; measuring, by the BLE module, a distance using a BLE signal, and then providing the result value to an IAU; and determining, by an IBU, whether to open or close a door of a vehicle and whether to start the vehicle based on a position of the fob which is checked based on a measurement result value.

In addition, the present invention may further include: after transmitting, by the fob, the UWB communication failure content to the BLE module, transmitting, by the BLE module, the communication failure content to the IAU; requesting, by the IBU, the IAU to measure the position of the fob when any one of a door handle button and a start button of the vehicle is pressed; and requesting, by the IAU, the BLE module to measure the position of the fob.

In addition, the present invention may further include: after providing, by the BLE module, the distance measurement result value to the IAU, checking, by the IAU, the position of the fob using the result value; and transmitting, by the IAU, the position of the fob to the IBU.

In addition, the distance measurement using the BLE signal may be distance measurement using an RSSI value of the BLE signal.

In addition, according to yet another aspect of the present invention, there is provided a smart key system configured to perform a remote parking assist function in response to a battery voltage drop, the smart key system including: a fob configured to transmit failure information to a BLE module to be described below when UWB communication fails; the in-vehicle BLE module configured to receive the failure information, and measure a distance for positioning of the fob using a BLE signal; and an IBU configured to transmit an operation signal to a remote parking controller based on positioning information of the fob which is checked based on the BLE signal.

In addition, the present invention may further include an IAU configured to request the positioning of the fob to the BLE module when the UWB communication fails, and check a position of the fob using a distance measurement result value received from the BLE module.

In addition, the IBU may receive the checked fob position from the IAU to determine whether to perform a remote parking assist function.

In addition, the distance measurement using the BLE signal may be distance measurement using an RSSI value of the BLE signal.

In addition, according to yet another aspect of the present invention, there is provided a method of operating a smart key system that performs a remote parking assist function in response to a battery voltage drop, the method including: forming a BLE connection between a fob and an in-vehicle BLE module; transmitting, by the fob, a communication failure content to the BLE module when UWB communication is impossible; measuring, by the BLE module, a distance using a BLE signal, and then providing the result value to an IAU; and determining, by an IBU, whether to perform a remote parking assist function based on a position of the fob which is checked based on a measurement result value.

In addition, the present invention may further include: after transmitting, by the fob, the UWB communication failure content to the BLE module, transmitting, by the BLE module, the communication failure content to the IAU; transmitting, by the fob, a remote parking command to the BLE module; transmitting, by the BLE module, the command to the IAU; transmitting, by the IAU, the command to the IBU; requesting, by the IBU, the IAU to measure the position of the fob; and requesting, by the IAU, the BLE module to measure the position of the fob.

In addition, the present invention may further include: after providing, by the BLE module, the distance measurement result value to the IAU, checking, by the IAU, the position of the fob using the result value; and transmitting, by the IAU, the fob position to the IBU.

In addition, the distance measurement using the BLE signal may be distance measurement using an RSSI value of the BLE signal.

In addition, according to yet another aspect of the present invention, there is provided a smart key system configured to perform an automatic vehicle locking function in response to a battery voltage drop, the smart key system including: a fob configured to transmit failure information to a BLE module to be described below when UWB communication fails; the in-vehicle BLE module configured to receive the failure information, and measure a distance for positioning of the fob using a BLE signal; and an IBU configured to transmit an operation signal to a vehicle door locking controller based on positioning information of the fob which is checked based on the BLE signal.

In addition, the present invention may further include an IAU configured to request the positioning of the fob to the BLE module when the UWB communication fails, and check a position of the fob using a distance measurement result value received from the BLE module.

In addition, the IBU may receive the checked fob position from the IAU to determine whether to perform an automatic vehicle locking function.

In addition, the distance measurement using the BLE signal may be distance measurement using an RSSI value of the BLE signal.

In addition, according to yet another aspect of the present invention, there is provided a method of operating a smart key system that performs an automatic vehicle locking function in response to a battery voltage drop, the method including: forming a BLE connection between a fob and an in-vehicle BLE module; transmitting, by the fob, a communication failure content to the BLE module when UWB communication is impossible; measuring, by the BLE module, a distance using a BLE signal, and then providing the result value to an IAU; and determining, by an IBU, whether to perform an automatic vehicle locking function based on a position of the fob which is checked based on a measurement result value.

In addition, the present invention may further include: after transmitting, by the fob, the UWB communication failure content to the BLE module, transmitting, by the BLE module, the communication failure content to the IAU; requesting, by the IBU, the IAU to measure the position of the fob; and requesting, by the IAU, the BLE module to measure the position of the fob.

In addition, the present invention may further include: after providing, by the BLE module, the distance measurement result value to the IAU, checking, by the IAU, the position of the fob using the result value; and transmitting, by the IAU, the fob position to the IBU.

In addition, the distance measurement using the BLE signal may be distance measurement using an RSSI value of the BLE signal.

In addition, according to yet another aspect of the present invention, there is provided a smart key system including: a fob configured to transmit failure information to a BLE module to be described below when UWB communication fails; the in-vehicle BLE module configured to receive the failure information, and measure a distance for positioning of the fob using a BLE signal; and an IBU configured to transmit an operation signal to a controller configured to control the vehicle based on positioning information of the fob which is checked based on the BLE signal.

In addition, the operation signal may be at least one of door opening signal or vehicle start signal.

In addition, the operation signal may be remote parking signal.

In addition, the operation signal may be door locking signal.

In addition, the present invention may further include an IAU configured to request the positioning of the fob to the BLE module when the UWB communication fails, and check a position of the fob using a distance measurement result value received from the BLE module.

In addition, the IBU may receive the checked fob position from the IAU to determine whether to open or close a door of a vehicle and whether to start the vehicle.

In addition, the IBU may receive the checked fob position from the IAU to determine whether to perform a remote parking assist function.

In addition, the IBU may receive the checked fob position from the IAU to determine whether to perform an automatic vehicle locking function.

In addition, the distance measurement using the BLE signal may be distance measurement using a received signal strength indicator (RSSI) value of the BLE signal.

In addition, according to yet another aspect of the present invention, there is provided a method of operating a smart key system, including: forming a BLE connection between a fob and an in-vehicle BLE module; transmitting, by the fob, a communication failure report to the BLE module when UWB communication is impossible; measuring, by the BLE module, a distance using a BLE signal, and then providing the result value to an IAU; and generating, by an IBU, an operation signal to transmit to a controller configured to control the vehicle, based on a position of the fob which is checked based on the result value.

In addition, the operation signal may be at least one of door opening signal or vehicle start signal.

In addition, the operation signal may be remote parking signal.

In addition, the operation signal may be door locking signal.

In addition, the present invention may further include: after transmitting, by the fob, the UWB communication failure report to the BLE module, transmitting, by the BLE module, the communication failure report to the IAU; requesting, by the IBU, the IAU to measure the position of the fob when any one of a door handle button and a start button of the vehicle is pressed; and requesting, by the IAU, the BLE module to measure the position of the fob.

In addition, the present invention may further include: after transmitting, by the fob, the UWB communication failure report to the BLE module, transmitting, by the BLE module, the communication failure report to the IAU; transmitting, by the fob, a remote parking command to the BLE module; transmitting, by the BLE module, the command to the IAU; transmitting, by the IAU, the command to the IBU; requesting, by the IBU, the IAU to measure the position of the fob; and requesting, by the IAU, the BLE module to measure the position of the fob.

In addition, the present invention may further include: after transmitting, by the fob, the UWB communication failure report to the BLE module, transmitting, by the BLE module, the communication failure report to the IAU; requesting, by the IBU, the IAU to measure the position of the fob; and requesting, by the IAU, the BLE module to measure the position of the fob.

In addition, the present invention may further include: after providing, by the BLE module, the distance measurement result value to the IAU, checking, by the IAU, the position of the fob using the result value; and transmitting, by the IAU, the position of the fob to the IBU.

In addition, the distance measurement using the BLE signal may be distance measurement using an RSSI value of the BLE signal.

In addition, according to still another aspect of the present invention, there is provided a fob of a vehicle including: a main control unit (MCU) configured to check a voltage of a battery in the fob, and configured to transmit information that the battery in the fob needs to be replaced when a case in which the voltage is smaller than or equal to a specific voltage is detected several times to a communication unit to be described below in the fob; and a communication unit configured to transmit the information that the battery needs to be replaced to an in-vehicle communication module, wherein the specific voltage is a voltage greater than or equal to a minimum voltage at which the fob communicates with an ultra-wideband (UWB) module of the vehicle.

In addition, the communication unit may transmit the information that the battery needs to be replaced to the in-vehicle communication module using BLE communication.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Advantages and features of the present invention, and a method of achieving them, will be apparent with reference to embodiments which is described in detail in conjunction with the accompanying drawings. However, the present invention is not limited to the embodiments which will be described below and may be implemented in different forms. The embodiments are only provided to completely disclose the present invention and completely convey the scope of the present invention to those skilled in the art, and the present invention is only defined by the disclosed claims. Meanwhile, terms used in the description are provided not to limit the present invention but to describe the embodiments. In the embodiments, the singular form is intended to also include the plural form unless the context clearly indicates otherwise. The terms 'comprise' and/or 'comprising' as used herein do not preclude the presence or addition of at least one other component, step, operation, and/or element other than the stated components, steps, operations and/or elements.

Figure 1:
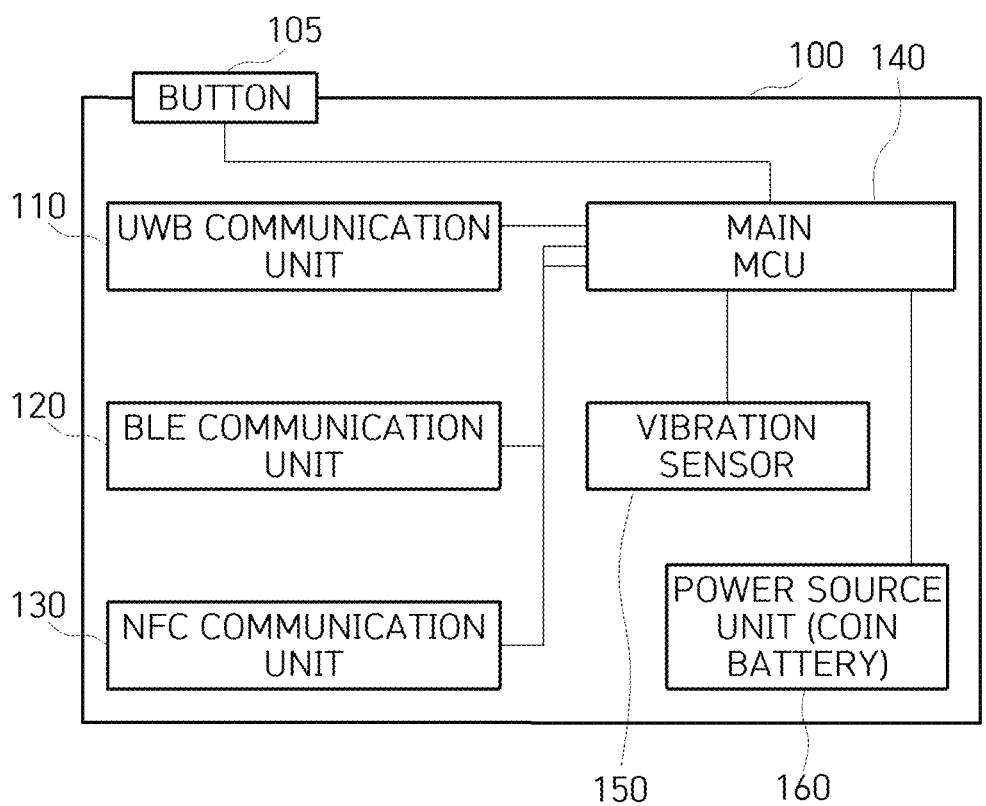
FIG. 1 is a view for describing a configuration of a fob according to one embodiment of the present invention.

FIG. 1 is a view for describing a configuration of a fob according to one embodiment of the present invention.

As shown in FIG. 1, a fob 100 of the present invention includes a button 105, an ultra-wideband (UWB) communication unit 110, a BLUETOOTH® low energy (BLE) communication unit 120, a near field communication (NFC) communication unit 130, a main control unit (MCU) 140, a vibration sensing sensor 150, a power source unit (hereinafter, referred to as a battery) 160. The button 105 may be replaced with a voice recognition method, an ultrasonic method, or an optical input method as well as a physical method. Further, each of the communication units 110, 120, and 130 may include an IC and an antenna (or a transceiver) which implement the communication method.

Figure 2:
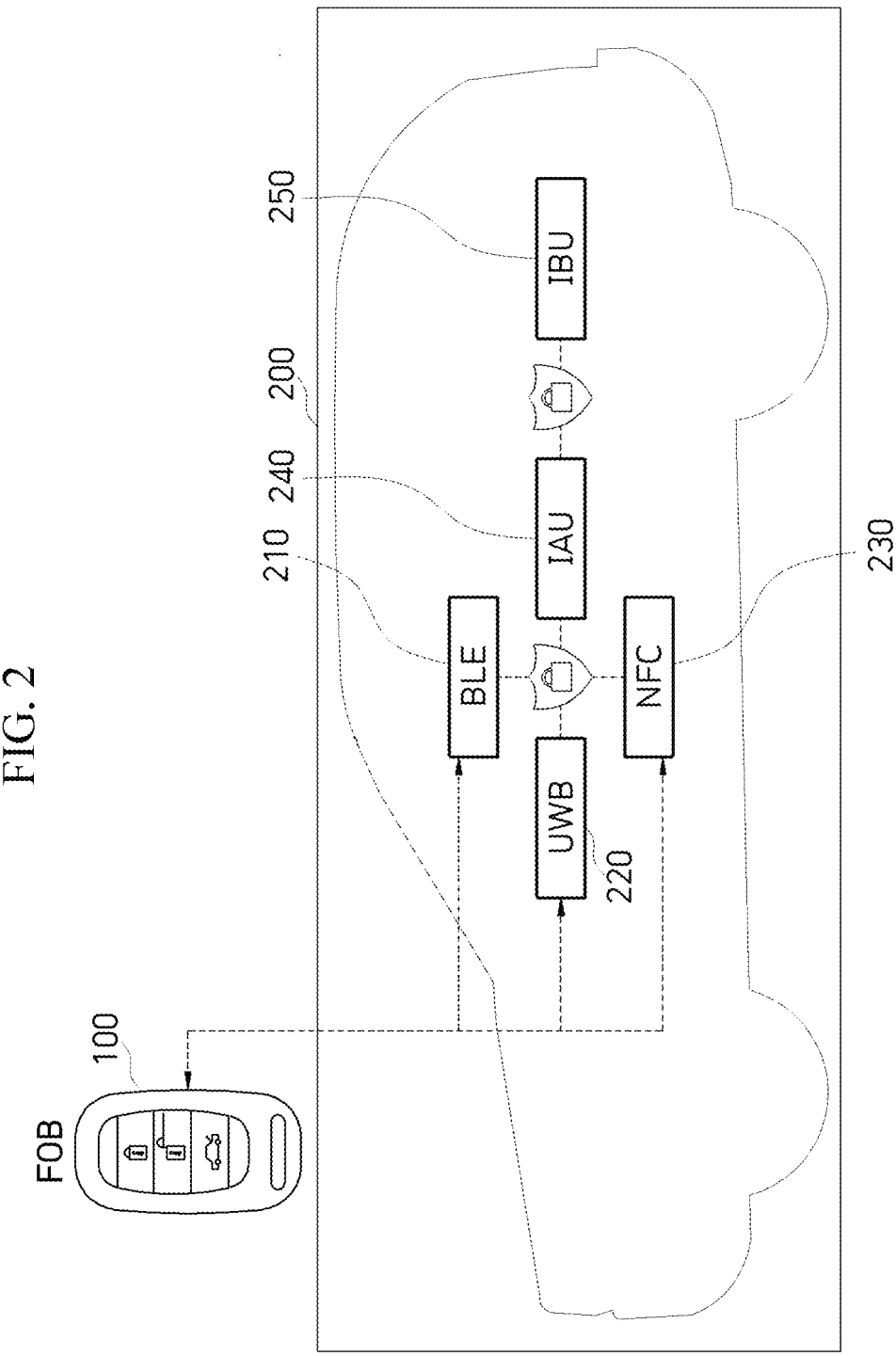
FIG. 2 is a view for describing a configuration of a smart key system according to one embodiment of the present invention.

FIG. 2 is a view for describing a configuration of a smart key system according to one embodiment of the present invention. As shown in FIG. 2, the smart key system of the present invention includes the fob 100 and a BLE module 210, a UWB module 220, an NFC module 230, an identification authentication unit (IAU) 240, and an integrated body unit (IBU) 250 of a vehicle 200. Each of the communication modules 210, 220, and 230 includes a transceiver and a circuit of each communication method.

Communication methods in this system include NFC communication, BLE communication, and UWB communication. Using NFC communication, the fob 100 may be registered in the vehicle, door opening and closing control may be performed when the battery 160 of the fob 100 is discharged, and the vehicle 200 may be started. Using BLE communication, vehicle door opening and closing control may be performed at a far distance of 30 m or more, and the vehicle 200 may be remotely started. Using UWB communication, the vehicle door opening and closing control may be performed at a short distance within 6 m, the vehicle 200 may be started, and a position of the fob 100 near the vehicle 200 may be checked.

Figure 3:
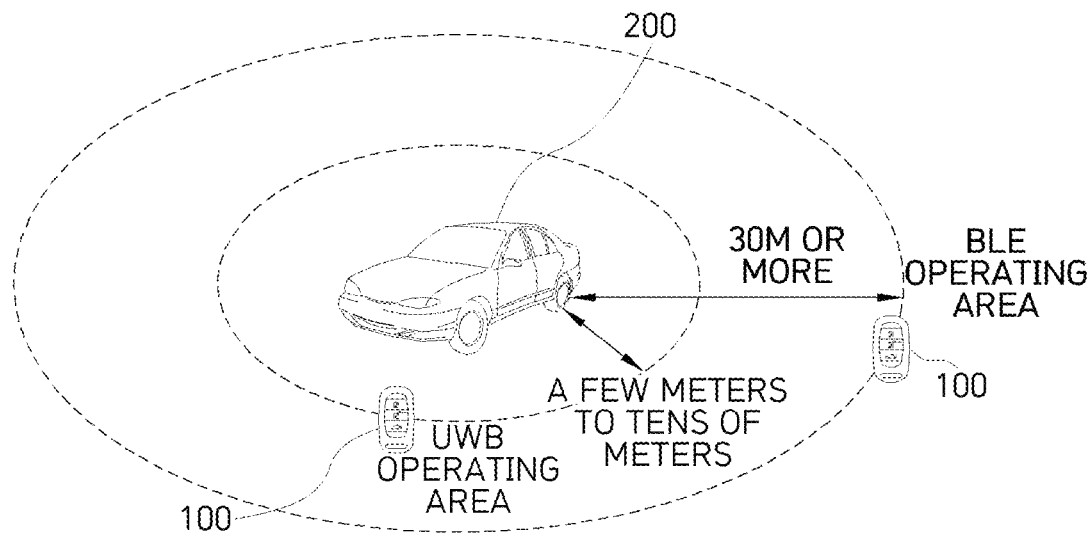
FIG. 3 is a view for describing operation regions of a BLUETOOTH® low energy (BLE) module and an ultra-wideband (UWB) module.

FIG. 3 is a view for describing operation regions of the BLE module 210 and the UWB module 220. As shown in FIG. 3, the UWB module 220 periodically operates in a range of several meters or several tens of meters from the vehicle 200.

In relation to door opening and closing and starting of the vehicle 200, a user may press a button of a door handle to determine the position of the fob 100 through UWB communication, and when the fob 100 is present near the door handle, the door of the vehicle 200 may be opened and closed. Further, when the user possesses the fob 100, gets in the vehicle 200 and presses the start button, the vehicle 200 may be started through UWB communication when the fob 100 is present in the vehicle 200.

In addition, in relation to the remote parking assist function (hereinafter, referred to as a remote smart parking assist (RSPA)) of the vehicle 200 using the fob 100, the user may park the vehicle 200 while pressing the button 105 of the fob 100. In this case, the position of the fob 100 is determined through UWB communication, and when the fob 100 is present near the vehicle 200, the vehicle 200 may move forward/backward.

In addition, in relation to automatic locking of the vehicle 200, when the user who possesses the fob 100 turns off the ignition of the vehicle 200, gets out of the vehicle 200 and closes the door, and moves away from the vehicle 200 to outside a predetermined range, an automatic locking function of the vehicle 200 may be performed.

Figure 4:
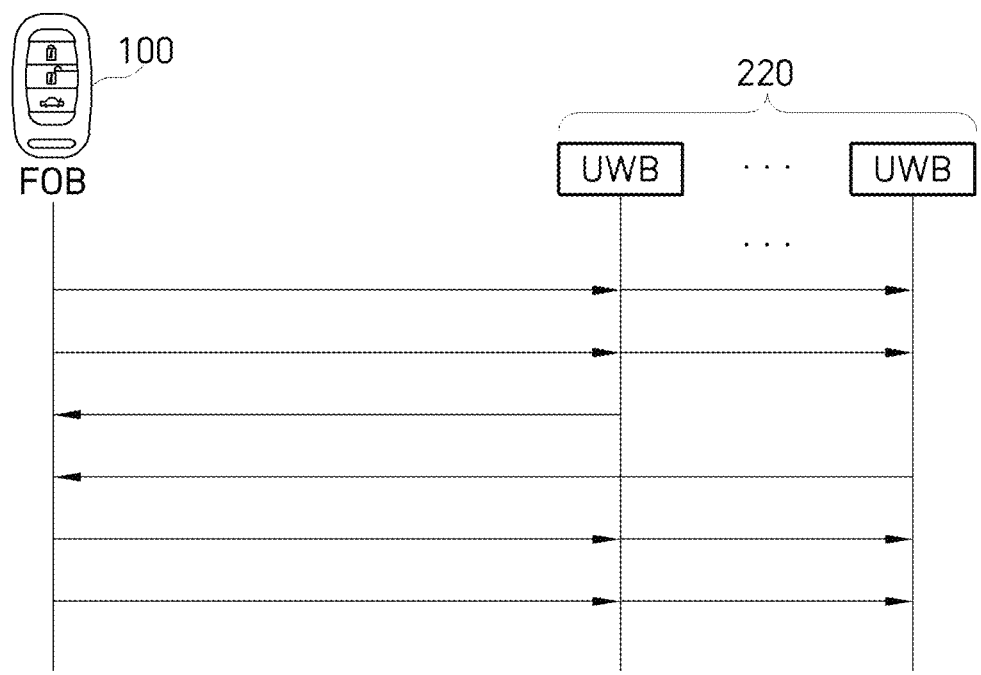
FIG. 4 is a view for describing a UWB operation process.

FIG. 4 is a view for describing a UWB operation process. After the fob 100 and the BLE module 210 of the vehicle 200 are connected, the fob 100 and the UWB module 220 in the vehicle 200 periodically perform UWB communication to check the position of the fob 100.

Figure 5:
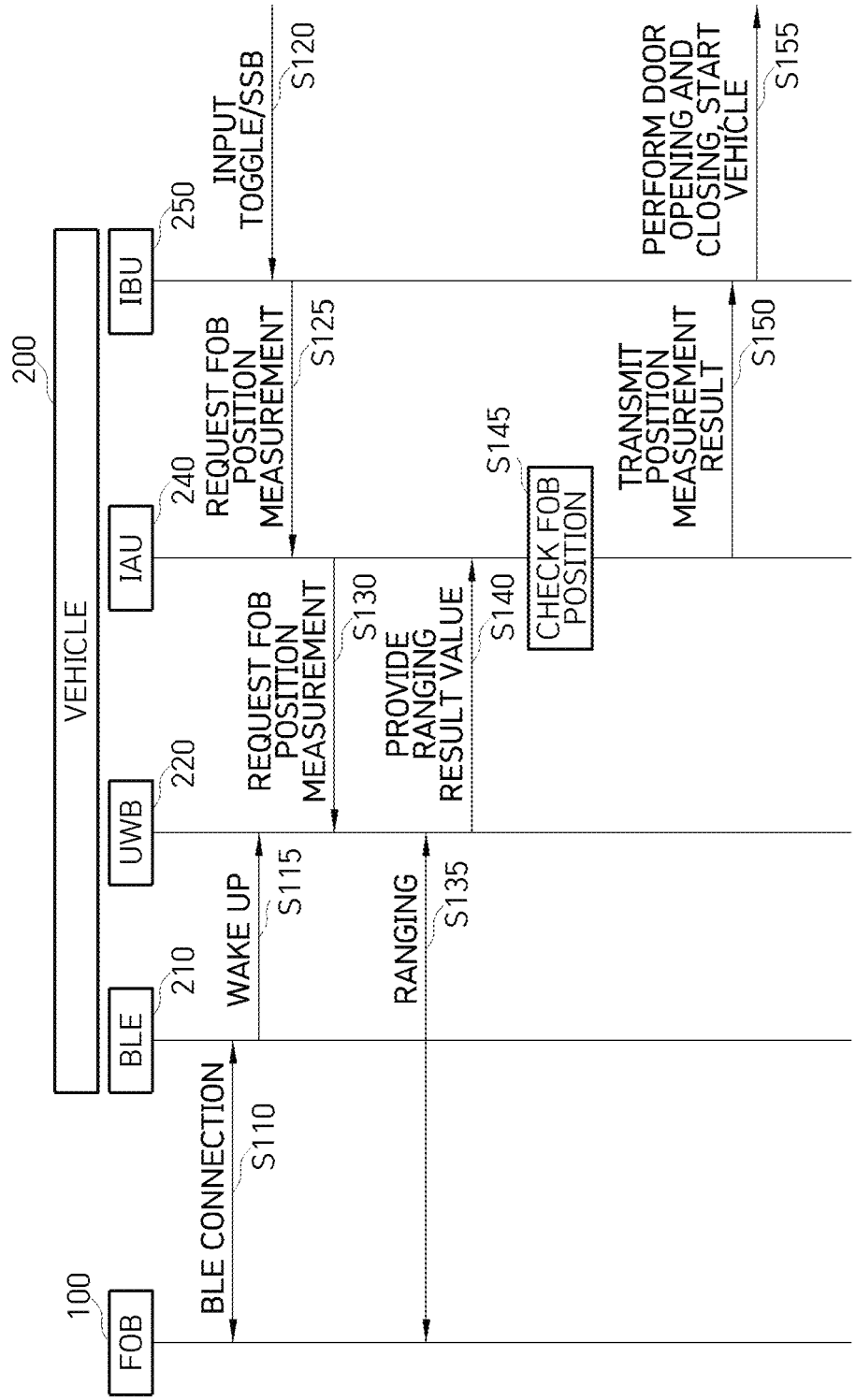
FIG. 5 is a flow chart for describing an operation method of vehicle door opening and closing and vehicle start by the smart key system.
Figure 6:
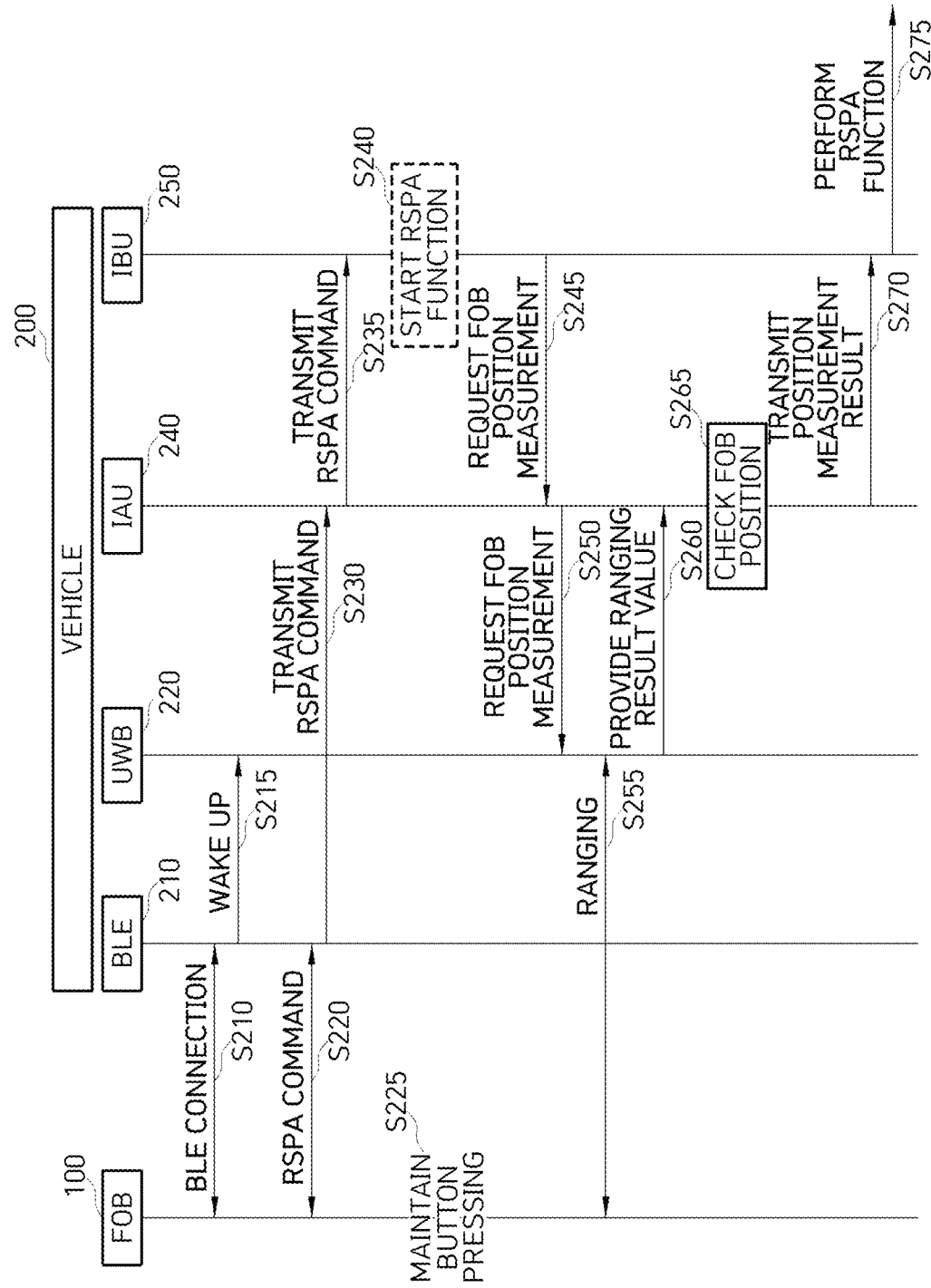
FIG. 6 is a flow chart for describing an operation method of remote smart parking assist (RSPA) by the smart key system.
Figure 7:
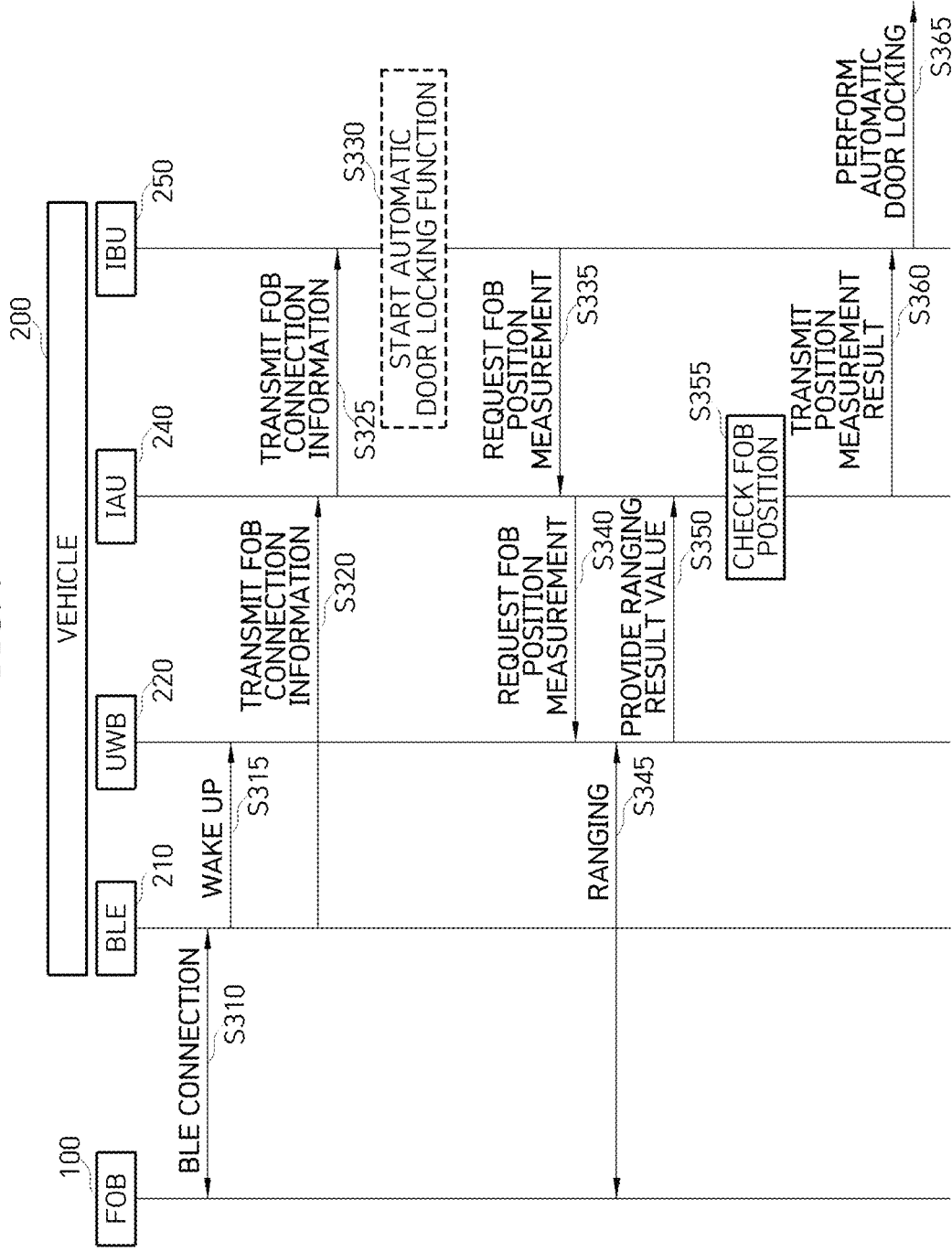
FIG. 7 is a flow chart for describing an operation method of automatic door locking by the smart key system.

FIGS. 5 to 7 illustrate an operation method of the smart key system in the case in which the voltage of the battery 160 of the fob 100 is maintained in a range in which UWB communication between the fob 100 and the vehicle 200 is normally performed.

FIG. 5 is a flow chart for describing an operation method of vehicle door opening and closing and vehicle start by the smart key system. In operation S110, when a BLE connection is formed between the fob 100 and the BLE module 210 of the vehicle 200, the BLE module 210 wakes up the UWB module 220 in operation S115. When the door handle button or the start button of the vehicle 200 is pressed in operation S120, the IBU 250 requests fob positioning from the IAU 240 in operation S125, and the IAU 240 requests the fob positioning from the UWB module 220 in subsequent operation S130. The UWB module 220 provides a ranging result value to the IAU 240 in operation S140 through ranging (distance measurement) in operation S135. In operation S145, the IAU 240 checks the position of the fob using the received ranging result value, and transmits a positioning result to the IBU 250 in operation S150. In operation S155, the IBU 250 performs the vehicle door opening and closing function when the door handle button is pressed and the fob 100 is present near the door handle, and performs the vehicle start function when the start button is pressed and the fob 100 is present in the vehicle 200. In this case, a method of performing the functions is performed by a method of directly transmitting an operation signal to a device such as a vehicle door, a vehicle power supply, or the like, or transmitting the operation signal to a controller which controls the door opening and closing and the start.

FIG. 6 is a flow chart for describing an operation method of remote smart parking assist (RSPA) by the smart key system. In operation S210, when a BLE connection is formed between the fob 100 and the BLE module 210 of the vehicle 200, the BLE module 210 wakes up the UWB module 220 in operation S215. When the user presses the button 105 of the fob in operation S220, the fob 100 transmits an RSPA command (remote parking command) to the BLE module 210. In this case, the user continuously presses the button of the fob until the vehicle reaches a desired position (S225). When the BLE module 210 transmits the RSPA command to the IAU 240 in operation S230 and the IAU 240 transmits the RSPA command to the IBU 250 in operation S235, an RSPA function is started (S240). When the IBU 250 requests fob positioning from the IAU 240 in operation S245, the IAU 240 requests the fob positioning from the UWB module 220 in subsequent operation S250. The UWB module 220 provides a ranging result value to the IAU 240 in operation S260 through ranging (distance measurement) in operation S255. In operation S265, the IAU 240 checks the position of the fob using the received ranging result value, and transmits a positioning result to the IBU 250 in operation S270. In operation S275, the IBU 250 performs the RSPA function when it is determined that the fob 100 is present near the vehicle 200. In this case, a method of performing the RSPA function is performed by a method of directly transmitting an operation signal to a device such as a device such as a driver, a transmission, or the like or transmitting the operation signal to an RSPA controller (a remote parking controller).

FIG. 7 is a flow chart for describing an operation method of automatic door locking by the smart key system. In operation S310, when a BLE connection is formed between the fob 100 and the BLE module 210 of the vehicle 200, the BLE module 210 wakes up the UWB module 220 in operation S315. The BLE module 210 transmits information that the fob is connected to the IAU 240 in operation S320, and the IAU 240 transmits the information that the fob is connected to the IBU 250 in subsequent operation S325. In operation S330, the IBU 250 starts an automatic door locking function. The IBU 250 requests fob positioning from the IAU 240 in operation S335, and the IAU 240 requests the fob positioning from the UWB module 220 in subsequent operation S340. The UWB module 220 provides a ranging result value to the IAU 240 in operation S350 through ranging (distance measurement) in operation S345. In operation S355, the IAU 240 checks the position of the fob using the received ranging result value, and transmits a positioning result to the IBU 250 in operation S360. In operation S365, the IBU 250 performs an automatic vehicle door locking function when it is determined that the fob is out of a predetermined range from the vehicle. In this case, a method of performing the automatic vehicle door locking function is performed by a method of directly transmitting an operation signal to the vehicle door, or transmitting the operation signal to a vehicle door locking controller.

As shown in FIGS. 5 to 7, in order to perform the door opening and closing function and the start function of the vehicle 200, the RSPA function, and the automatic locking function using the fob 100, the vehicle 200 should determine the position of the fob 100 through UWB communication. However, since an operating current during UWB communication is large, a fob which has been used for several months or a fob left at a low temperature may not perform UWB communication due to a drop in battery voltage, and accordingly, when the position of the fob 100 is not checked, since it may not be determined whether the fob 100 is present near the door handle of the vehicle 200 or is present in the vehicle 200, the door opening and closing function and the start function of the vehicle 200 may not be performed, since it is not checked whether the fob 100 is present near the vehicle 200 (within several meters near the vehicle), the RSPA function may not be performed, and since it is not possible to check whether the user have moved away from the vehicle 200 and is outside a predetermined range, the automatic vehicle door locking function may not be performed. Accordingly, it is necessary to analyze the voltage drop of the battery 160 of the fob and to respond thereto.

The contents of confirming an operating current which is consumed and a voltage change of the battery 160 of the fob during operation during the vehicle door opening and closing/the vehicle start operation of the fob 100 for each of UWB communication and BLE communication is the same as in Table 1 below.

Table 1 below shows degrees of falls in an operating current and the voltage for each communication method when UWB communication and BLE communication are performed with a fob that has been tested for several days. During UWB communication, a case in which the voltage drops to 2.0V occurred.

TABLE 1

|  | UWB communication | BLE communication |
| --- | --- | --- |
| operating current | 150~200 mA | 10 mA |
| voltage change | 2.9 V drop to 2.0 V | 2.9 V drop to 2.7 V |

In a fob which has been used for several months, there is a possibility in that UWB communication may fail when the voltage falls under 1.8V during UWB communication.

In order to solve this problem, the following two countermeasures are proposed.

The user needs to be made aware of the need to replace the fob battery. For the above, in one embodiment of the present invention, the MCU 140 in the fob 100 checks the voltage of the fob battery 160 during BLE communication, and transmits information that the fob battery 160 needs to be replaced to the BLE module 210 through BLE communication when the fob battery 160 is detected below a specific voltage several times. A value greater than or equal to the specific voltage may be set by checking a minimum voltage of the fob battery 160 which may be used for UWB communication. The BLE module 210 transmits the fob battery information to the IAU 240 and the IAU 240 transmits the fob battery information to the IBU 250 so that the IBU 250 informs the user that the fob battery 160 needs to be replaced. In this case, a notification method may be performed through a sign, a message, or a warning sound displayed on a dashboard of the vehicle 200 or a mobile phone connected to the vehicle 200.

According to another embodiment of the present invention, the MCU 140 in the fob 100 checks the voltage of the fob battery 160 during BLE communication and transmits voltage information of the fob battery 160 to the BLE module 210 through BLE communication when the voltage is detected several times below a threshold voltage 1, and the IBU 250 determines that the time to replace the fob battery 160 has arrived and notifies the above to the user when the BLE module 210 transmits the fob battery information to the IAU 240 and the IAU 240 transmits the fob battery information to the IBU 250. A value greater than or equal to the threshold voltage 1 may be set by checking the minimum voltage of the fob battery 160 capable of UWB communication. When the voltage information that the fob battery 160 is at the threshold voltage 1 or less is repeatedly transmitted at intervals of a predetermined period, the IBU 250 gradually increases a level of notification. For example, the content of the sign or message displayed on the dashboard of the vehicle 200 or the mobile phone connected to the vehicle 200 may be changed, or the presence, a size, and a frequency of the warning sound may be varied for notification. Further, the MCU 140 in the fob 100 checks the voltage of the fob battery 160 during BLE communication, and transmits the voltage information of the fob battery 160 to the BLE module 210 through BLE communication when the voltage is detected several times above a threshold voltage 2. A value smaller than or equal to the threshold voltage 2 may be set by checking the minimum voltage of the fob battery 160 which may be acquired when replacing with a new battery. The BLE module 210 transmits the fob battery information to the IAU 240 and the IAU 240 transmits the fob battery information to the IBU 250, and after the time to replace the fob battery 160 arrives, the IBU 250, which has received the voltage information that the fob battery is at the threshold voltage 2 or more, determines that replacement of the fob battery 160 is complete, and thus cancels a notification that the time to replace the fob battery 160 has arrived, and notifies the user that the replacement has been completed. As an example of the notification method, there may be a sign or message displayed on a dashboard or a mobile phone connected to the vehicle 200. After the IBU 250 notifies the user that the replacement of the fob battery 160 is complete, the IBU 250 does not notify the user even when a battery voltage greater or than equal to the threshold voltage 2 is transmitted thereafter.

After a BLE connection, when the voltage of the fob battery 160 is low, and thus BLE communication is possible but UWB communication is not possible, the user who possesses the fob 100 may perform a door opening and closing function and a vehicle start function only near the door handle of the vehicle 200 and in the vehicle 200 and may perform the RSPA function only near the vehicle by measuring the position of the fob through BLE communication and using the positioning result, and the user who possesses the fob 100 may perform an automatic vehicle locking function when being out of a predetermined range from the vehicle 200.

Figure 8:
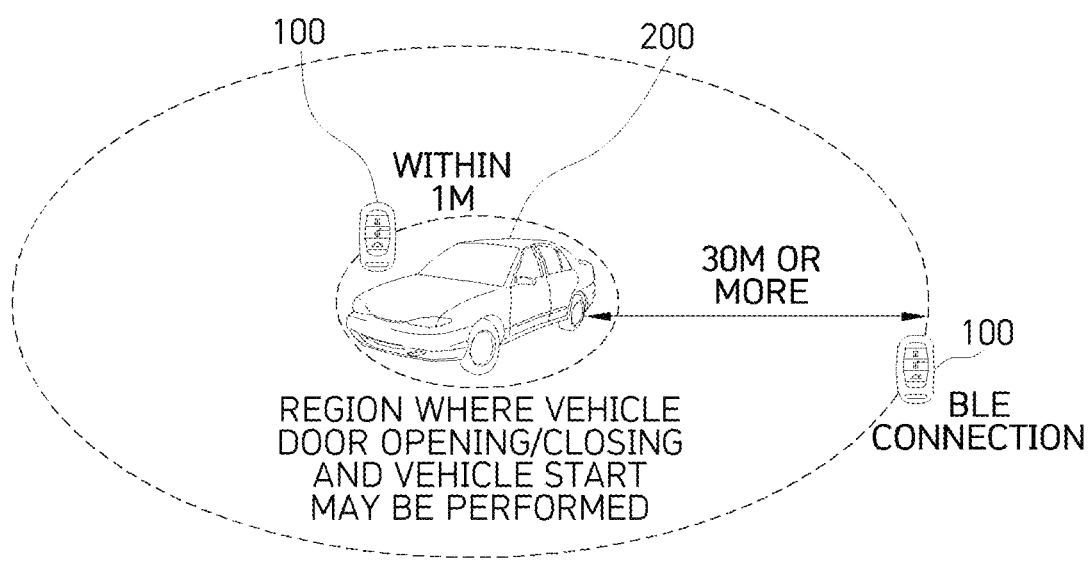
FIG. 8 is a view for describing a region where the vehicle door opening and closing and the vehicle start may be performed and the BLE operation region.
Figure 9:
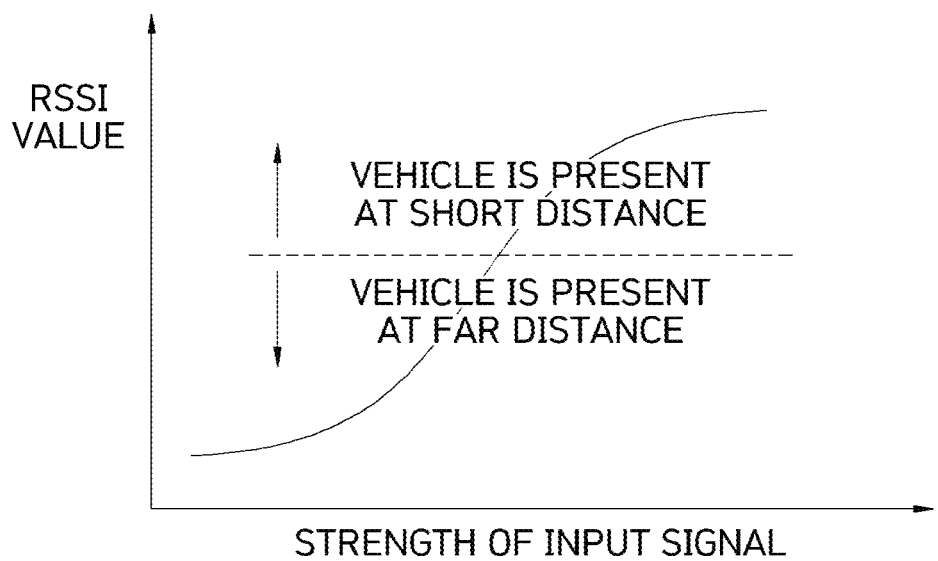
FIG. 9 is a view for describing a relationship of a received signal strength indicator (RSSI) value of the BLE and a distance between a vehicle and the fob.

FIG. 8 is a view for describing a region where the vehicle door opening and closing and the vehicle start may be performed and a BLE operation region, and FIG. 9 is a view for describing a relationship of a received signal strength indicator (RSSI) value of the BLE and a distance between the vehicle 200 and the fob 100.

According to one embodiment of the present invention for performing the above functions, during BLE communication, BLE signal strength is checked in the BLE communication unit 120 in the fob 100 or the BLE module 210 in the vehicle 200, and the BLE signal strength is converted to a distance in the BLE module 210, and thus may be used to determine whether to perform the door opening and closing function, the vehicle start function, the RSPA function, and the automatic vehicle locking function based on this distance. In this case, an RSSI value of the BLE signal may be used as the BLE signal strength. For example, when it is determined that the fob 100 is near the door handle of the vehicle or in the vehicle, the door opening and closing function and the vehicle start function are performed, and when it is determined that the fob 100 is near the vehicle 200, the RSPA function is performed. Further, when the RSSI value of the BLE signal is confirmed to be smaller than or equal to a specific value, it is determined that the fob 100 has moved away from the vehicle 200 and thus the automatic vehicle locking function is performed.

Looking at operating specifications of each component of the smart key system in one embodiment of the present invention, the fob 100 transmits a failure content to the BLE module 210 of the vehicle 200 when UWB communication fails due to a fob battery voltage drop, the BLE module 210 of the vehicle 200 transmits the failure content to the IAU 240, and when there is a fob positioning request from the IAU 240, ranging (distance measurement) is performed using the RSSI value of the BLE signal, and the result value is transmitted to the IAU 240. Upon receiving the failure content of UWB communication, when there is a fob positioning request from the IBU 250, the IAU 240 makes a fob positioning request to the BLE module 210, and when the ranging result value is received by the BLE module 210, the IAU 240 checks the position of the fob through this value and transmits the result to the IBU 250, and whether to perform vehicle door opening and closing function, the vehicle start function, the RSPA function, and the vehicle door is determined according to the positioning result.

In one embodiment of the present invention, when there is one BLE module 210 in the vehicle 200, the distance between the BLE module 210 and the fob 100 converted using the RSSI value of the BLE signal becomes the measured position information of the fob 100.

In another embodiment of the present invention, when there are three or more BLE modules 210 in the vehicle 200, for example, when four BLE modules 210 are disposed on a front side portion, a rear side portion, a left side portion, and a right side portion of the vehicle, the position of the fob 100 may be determined using the RSSI value of the BLE signal which varies according to a position of a receiver included in each BLE module 210, and this becomes the measured position information of the fob 100.

Figure 10:
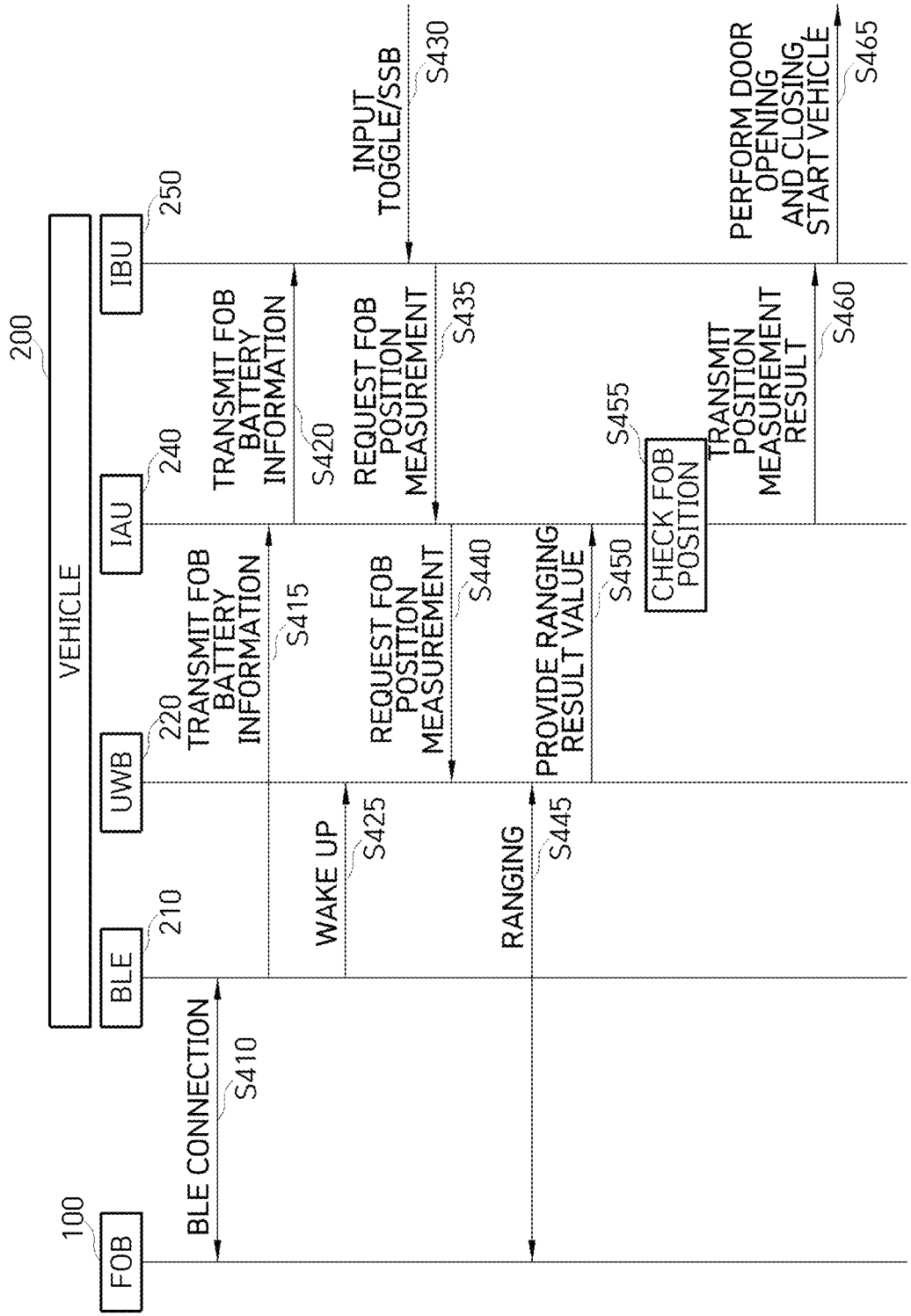
FIG. 10 is a flow chart for describing a method of operating a smart key system for fob battery information transmission, vehicle door opening and closing, and vehicle start according to one embodiment of the present invention.

FIGS. 10 to 13 are views for describing a method of operating a smart key system according to the two countermeasures. FIG. 10 relates to countermeasure ①, and FIGS. 11 to 13 relate to countermeasure ②.

FIG. 10 is a flow chart for describing the method of operating a smart key system for fob battery information transmission, the vehicle door opening and closing, and the vehicle start according to one embodiment of the present invention.

In operation S410, a BLE connection is formed between the fob 100 and the BLE module 210 of the vehicle 200. The MCU 140 in the fob 100 checks the voltage of the fob battery 160 during BLE communication, and transmits the information that the fob battery 160 needs to be replaced to the BLE module 210 through BLE communication when the fob battery 160 is detected below a specific voltage several times. The BLE module 210 transmits the information that the fob battery needs to be replaced to transmits to the IAU 240 in operation S415, and the IAU 240 transmits this information to the IBU 250 in operation S420. Since a value greater than or equal to the minimum voltage of the fob battery 160 at which UWB communication is able to be performed is set as the specific voltage, the IBU 250 may perform UWB communication. Accordingly, the BLE module 210 wakes up the UWB module 220 in operation S425. When a door handle button of the vehicle 200 is pressed or a start button is pressed in operation S430, the IBU 250 requests the fob positioning from the IAU 240 in operation S435, and the IAU 240 requests the fob positioning from the UWB module 220 in subsequent operation S440. The UWB module 220 provides a ranging result value to the IAU 240 in operation S450 through ranging (distance measurement) in operation S445. In operation S455, the IAU 240 checks the position of the fob using the received ranging result value, and transmits a positioning result to the IBU 250 in operation S460. In operation S465, the IBU 250 performs the vehicle door opening and closing function when the door handle button is pressed and the fob 100 is present near the door handle, and performs the vehicle start function when the start button is pressed and the fob 100 is present in the vehicle 200. In this case, a method of performing the functions is performed by a method of directly transmitting an operation signal to a device such as a vehicle door, a vehicle power supply, or the like, or transmitting the operation signal to a controller which controls the door opening and closing and the start.

Figure 11:
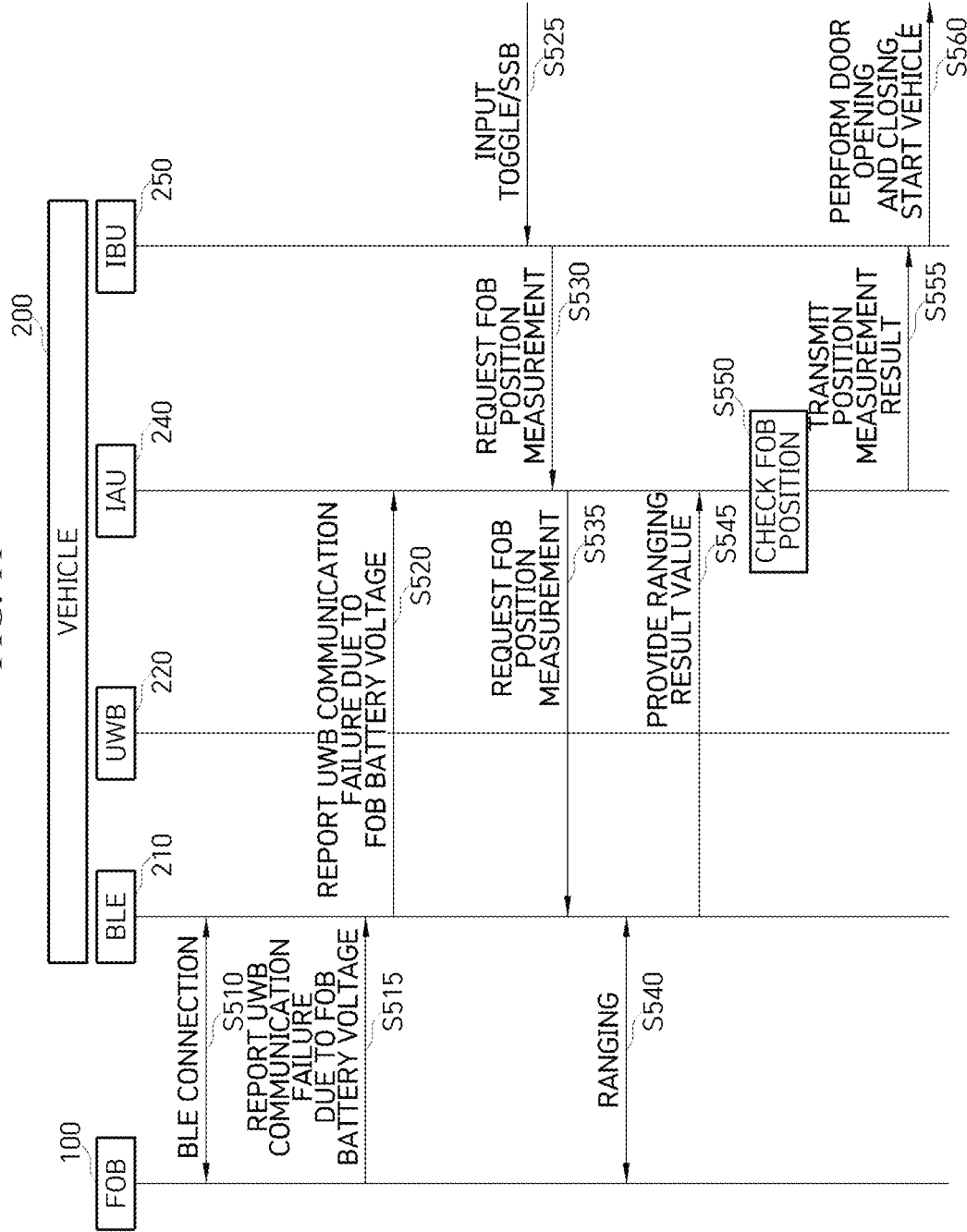
FIG. 11 is a flow chart for describing a method of operating a smart key system for performing a vehicle door opening and closing function and a vehicle start function under a condition of a battery voltage drop of the fob according to one embodiment of the present invention.
Figure 12:
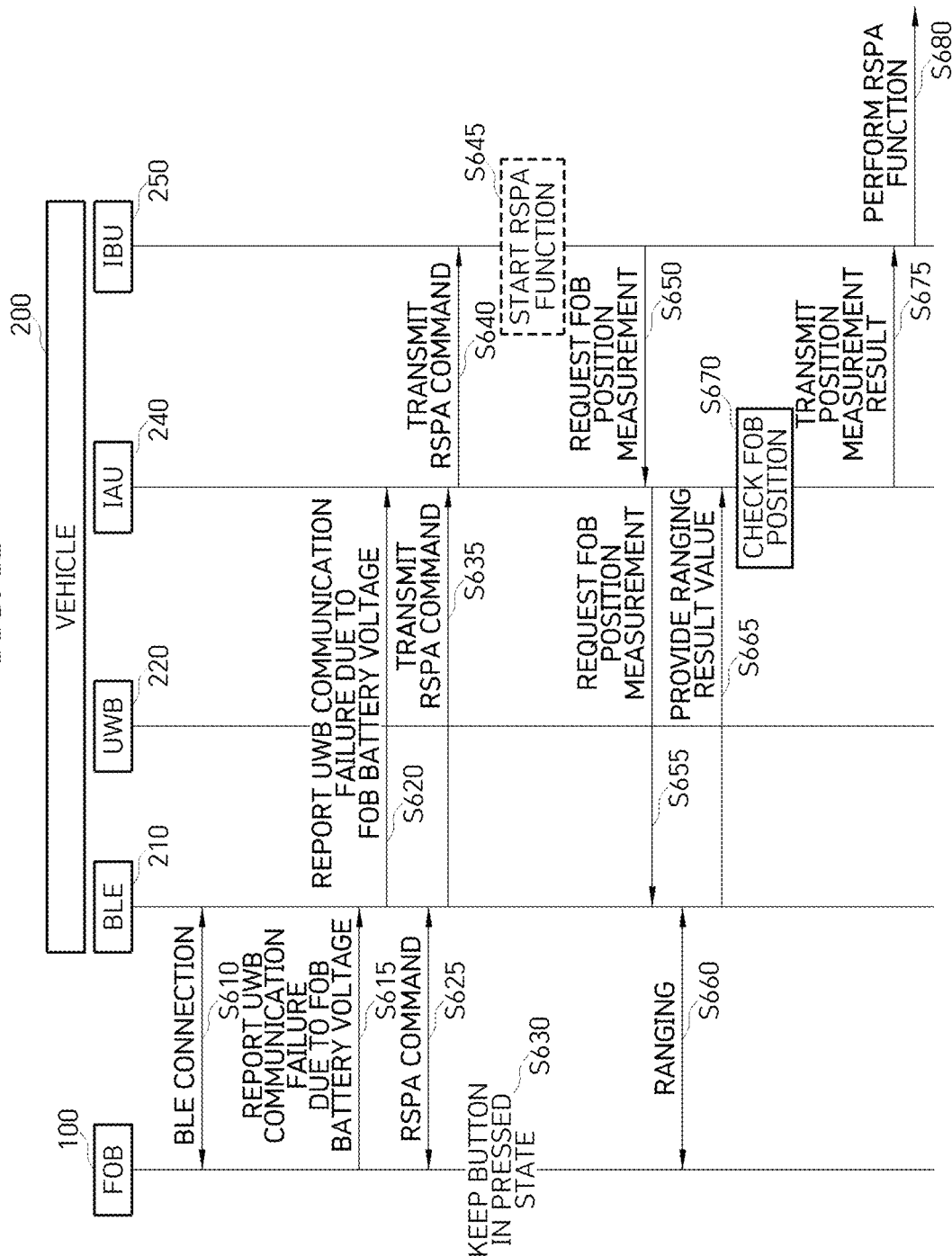
FIG. 12 is a flow chart for describing a method of operating a smart key system for performing an RSPA function under the condition of the battery voltage drop of the fob according to one embodiment of the present invention.
Figure 13:
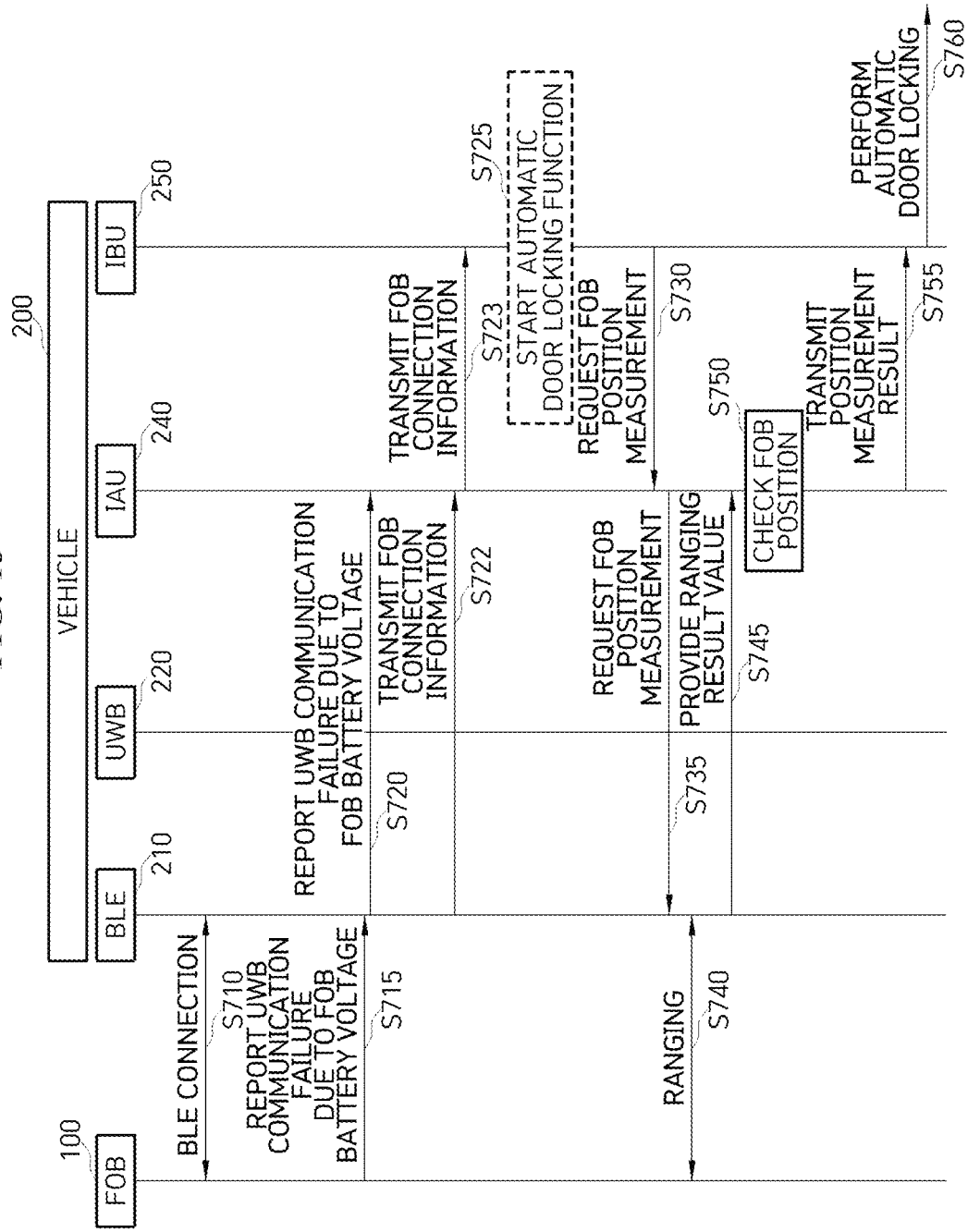
FIG. 13 is a flow chart for describing a method of operating a smart key system for performing an automatic door locking function under the condition of the battery voltage drop of the fob according to one embodiment of the present invention.

FIGS. 11 to 13 are views for describing the method of operating a smart key system when UWB communication fails due to the battery voltage drop of the fob.

FIG. 11 is a flow chart for describing a method of operating a smart key system for performing a vehicle door opening and closing function and a vehicle start function under a condition of the battery voltage drop of the fob according to one embodiment of the present invention In operation S510, a BLE connection is formed between the fob 100 and the BLE module 210 of the vehicle 200. In operation S515, the fob 100 transmits a UWB communication failure content to the BLE module 210 when the fob battery voltage is low after the BLE connection and thus UWB communication is impossible. In operation S520, the BLE module 210 transmits the failure content to the IAU 240. When the door handle button or the start button of the vehicle 200 is pressed in operation S525, the IBU 250 requests fob positioning from the IAU 240 in operation S530, and the IAU 240 requests the fob positioning from the BLE module 210 in subsequent operation S535. The BLE module 210 provides a ranging result value to the IAU 240 in operation S545 through ranging (distance measurement) in operation S540. In operation S550, the IAU 240 checks the position of the fob using the received ranging result value, and transmits a positioning result to the IBU 250 in operation S555. In operation S560, the IBU 250 performs the vehicle door opening and closing function when the door handle button is pressed and the fob 100 is present near the door handle, and performs the vehicle start function when the start button is pressed and the fob 100 is present in the vehicle 200. In this case, a method of performing the functions is performed by a method of directly transmitting an operation signal to a device such as a vehicle door, a vehicle power supply, or the like, or transmitting the operation signal to a controller which controls the door opening and closing and the start.

FIG. 12 is a flow chart for describing a method of operating a smart key system for performing an RSPA function under the condition of the battery voltage drop of the fob according to one embodiment of the present invention.

In operation S610, a BLE connection is formed between the fob 100 and the BLE module 210 of the vehicle 200. In operation S615, the fob 100 transmits a UWB communication failure content to the BLE module 210 when the fob battery voltage is low after the BLE connection and thus UWB communication is impossible. In operation S620, the BLE module 210 transmits the failure content to the IAU 240. When the user presses the button 105 of the fob in operation S625, the fob 100 transmits an RSPA command (remote parking command) to the BLE module 210. In this case, the user continuously presses the button until the vehicle reaches a desired position (S630). When the BLE module 210 transmits the RSPA command to the IAU 240 in operation S635 and the IAU 240 transmits the RSPA command to the IBU 250 in subsequent operation S640, an RSPA function is started (S645). When the IBU 250 requests fob positioning from the IAU 240 in operation S650, the IAU 240 requests the fob positioning from the BLE module 210 in subsequent operation S655. The BLE module 210 provides a ranging result value to the IAU 240 in operation S665 through ranging (distance measurement) in operation S660. In operation S670, the IAU 240 checks the position of the fob using the received ranging result value, and transmits a positioning result to the IBU 250 in operation S675. In operation S680, the IBU 250 performs the RSPA function when it is determined that the fob 100 is present near the vehicle 200. In this case, a method of performing the RSPA function is performed by a method of directly transmitting an operation signal to a device such as a device such as a driver, a transmission, or the like or transmitting the operation signal to an RSPA controller (a remote parking controller).

FIG. 13 is a flow chart for describing a method of operating a smart key system for performing an automatic door locking function under the condition of the battery voltage drop of the fob according to one embodiment of the present invention.

In operation S710, a BLE connection is formed between the fob 100 and the BLE module 210 of the vehicle 200. In operation S715, the fob 100 transmits the UWB communication failure content to the BLE module 210 when the fob battery voltage is low after the BLE connection and thus UWB communication is impossible. In operation S720, the BLE module 210 transmits the failure content to the IAU 240. The BLE module 210 transmits information that the fob is connected to the IAU 240 in operation S722, and the IAU 240 transmits the information that the fob is connected to the IBU 250 in subsequent operation S723. In operation S725, the IBU 250 starts an automatic door locking function. The IBU 250 requests fob positioning from the IAU 240 in operation S730, and the IAU 240 requests the fob positioning from the BLE module 210 in subsequent operation S735. The BLE module 210 provides a ranging result value to the IAU 240 in operation S745 through ranging (distance measurement) in operation S740. In operation S750, the IAU 240 checks the position of the fob using the received ranging result value, and transmits a positioning result to the IBU 250 in operation S755. In operation S760, the IBU 250 performs an automatic vehicle door locking function when it is determined that the fob 100 is out of a predetermined range from the vehicle. In this case, the method of performing the automatic vehicle door locking function is performed by a method of directly transmitting an operation signal to a vehicle door, or transmitting the operation signal to a vehicle door locking controller.

In one embodiment of the present invention, a communication unit of a fob or a communication module in the vehicle according to another wireless communication method may be added to the fob 100 or the inside of the vehicle 200, and the communication unit may replace functions of a BLE communication unit, a UWB communication unit, an NFC communication unit, and the communication module may replace functions of a BLE module, a UWB module, and an NFC module. Examples of other wireless communication methods which may be added may include low frequency (LF), radio frequency (RF), UHF, LTE, LTE advance (LTE-A), code division multiple access (CDMA), wideband CDMA (WCDMA), universal mobile telecommunications system (UMTS), wireless broadband (WiBro), global system for mobile communications (GSM), wireless fidelity (WIFI®), BLUETOOTH®, ZIGBEE® magnetic secure transmission, or a body area network (BAN), GNSS. The GNSS may be a global positioning system (GPS), a global navigation satellite system (Glonass), a Beidou navigation satellite system, or Galileo, which is a European global satellite-based navigation system.

The term "module" used herein may refer to, for example, a unit including one or a combination of two or more of hardware, software, and firmware. The term "module" may be used interchangeably with terms such as, for example, a unit, a logic, a logical block, a component, or a circuit. A "module" may be a minimum unit or a part of an integrated component. A "module" may be a minimum unit or a part which performs one or more functions. A "module" may be mechanically or electronically implemented. For example, a "module" may be one of an application-specific integrated circuit (ASIC) chips, field-programmable gate arrays (FPGAs), or a programmable-logic device which is known or will be developed, and performs predetermined operations.

According to one aspect of the present invention, inconvenience in that a user cannot control a vehicle when battery performance of a fob falls due to use for a certain period or being left at low temperature is eliminated.

Further, there is an advantage in that a user can recognize the fact that battery voltage falls and thus a battery can be replaced before being discharged.

In the above, configurations of the present invention have been specifically described with reference to the preferable embodiment and the accompanying drawings, but are only examples, and various modifications are possible within the scope without departing from the technical spirit of the present invention. Accordingly, the scope of the present invention should not be limited to the described embodiments and should be defined by the claims to be described below as well as equivalents thereof.

What is claimed is:

1. A smart key system, comprising:
   a fob configured to:
      determine that the fob battery voltage is below a threshold causing an ultra-wideband (UWB) communication to fail;
      transmit the failure information to an in-vehicle BLUETOOTH® low energy (BLE) module;
   the in-vehicle BLE module configured to receive the failure information and measure a distance for positioning the fob using a BLE signal; and
   a controller configured to receive an operation signal and further configured to control the vehicle based on positioning information of the fob based on the BLE signal.

2. The smart key system of claim 1, wherein the operation signal is at least one of a door opening signal or a vehicle start signal.

3. The smart key system of claim 1, wherein the operation signal is a remote parking signal.

4. The smart key system of claim 1, wherein the operation signal is a door locking signal.

5. The smart key system of claim 1, further configured to request the positioning of the fob to the BLE module when the UWB communication fails, and check a position of the fob using a distance measurement result value received from the BLE module.

6. The smart key system of claim 5, wherein the controller receives the operation signal based on the checked fob position and further based on a determination of whether to open or close a door of the vehicle and whether to start the vehicle.

7. The smart key system of claim 5, wherein the controller receives the operation signal based on the checked fob position and further based on a determination of whether to perform a remote parking assist function.

8. The smart key system of claim 5, wherein the controller receives the operation signal based on the checked fob position and further based on a determination of whether to perform an automatic vehicle locking function.

9. The smart key system of claim 1, wherein the distance measurement using the BLE signal is distance measurement using a received signal strength indicator (RSSI) value of the BLE signal.

10. A method of operating a smart key system, comprising:
- forming a BLUETOOTH® low energy (BLE) connection between a fob and an in-vehicle BLE module;
- determining, by the fob, that the fob voltage is below a threshold causing an ultra-wideband (UWB) communication to fail;
- transmitting, by the fob, a communication failure report to the BLE module;
- measuring, by the BLE module, a distance using a BLE signal, and then providing a result value to an identification authentication unit (IAU); and
- generating an operation signal to transmit to a controller configured to control the vehicle, based on a position of the fob based on the result value.

11. The method of claim 10, wherein the operation signal is at least one of a door opening signal or a vehicle start signal.

12. The method of claim 10, wherein the operation signal is a remote parking signal.

13. The method of claim 10, wherein the operation signal is a door locking signal.

14. The method of claim 10, further comprising:
- after transmitting, by the fob, the communication failure report to the BLE module,
- transmitting, by the BLE module, the communication failure report; and
- measuring the position of the fob when any one of a door handle button or a start button of the vehicle is pressed.

15. The method of claim 10, further comprising:
- after transmitting, by the fob, the communication failure report to the BLE module,
- transmitting, by the BLE module, the communication failure report;
- transmitting, by the fob, a remote parking command to the BLE module;
and
- measuring, by the BLE module, the position of the fob.

16. The method of claim 10, further comprising:
- after transmitting, by the fob, the UWB communication failure report to the BLE module,
and
- measuring, by the BLE module, the position of the fob.

17. The method of claim 10, further comprising:
- providing, by the BLE module, the distance measurement result value.

18. The method of claim 10, wherein the distance measurement using the BLE signal is distance measurement using a received signal strength indicator (RSSI) value of the BLE signal.

* * * * *